(12) United States Patent
Panzram et al.

(10) Patent No.: US 9,452,901 B2
(45) Date of Patent: Sep. 27, 2016

(54) SYSTEM AND METHOD FOR LOADING AND UNLOADING A CARGO COMPARTMENT

(71) Applicants: Airbus Operations GmbH, Hamburg (DE); Airbus S.A.S., Blagnac (FR)

(72) Inventors: Uwe Panzram, Ganderkesee (DE); Joerg Klockgether, Toulouse (FR); Philippe Le Bigot, Blagnac (FR); Peter Esteie, Tournefeuille AA (FR); Netra Gowda, Toulouse (FR)

(73) Assignees: AIRBUS OPERATIONS GMBH, Hamburg (DE); AIRBUS S.A.S., Blagnac (FR)

( * ) Notice: Subject to any disclaimer, the term of this patent is extended or adjusted under 35 U.S.C. 154(b) by 0 days.

(21) Appl. No.: 14/303,979

(22) Filed: Jun. 13, 2014

(65) Prior Publication Data
US 2014/0377043 A1   Dec. 25, 2014

(30) Foreign Application Priority Data

Jun. 21, 2013  (EP) ..................................... 13173313

(51) Int. Cl.
| B65G 67/00 | (2006.01) |
| B64D 9/00 | (2006.01) |
| B64C 1/20 | (2006.01) |

(52) U.S. Cl.
CPC .................. B65G 67/00 (2013.01); B64C 1/20 (2013.01); B64D 9/00 (2013.01); B64D 2009/006 (2013.01)

(58) Field of Classification Search
CPC ........ B65G 67/00; B64C 1/20; B64D 9/003; B64D 9/00; B64D 2009/006
USPC ....... 414/398, 522, 676, 340, 343, 352, 353, 414/373, 495, 498; 292/2, 3, 5–7, 35–38, 292/41; 206/454, 710, 711; 406/86–88, 184
See application file for complete search history.

(56) References Cited

U.S. PATENT DOCUMENTS

| 3,454,172 A | * | 7/1969 | Carr | ........................ | B65G 67/00 |
| | | | | | 414/343 |
| 3,593,817 A | * | 7/1971 | Hawkins | ................ | B60V 3/025 |
| | | | | | 180/116 |

(Continued)

FOREIGN PATENT DOCUMENTS

| DE | 2735737 A1 | 2/1979 |
| GB | 874279 A | 8/1961 |
| GB | 2041321 A | 7/1980 |

OTHER PUBLICATIONS

European Patent Office, Extended European Search Report for European Patent Application No. 13173313.1, mailed Nov. 15, 2013.

*Primary Examiner* — Kaitlin Joerger
(74) *Attorney, Agent, or Firm* — Lorenz & Kopf, LLP

(57) ABSTRACT

A system for loading and unloading a cargo compartment of a vehicle, such as an aircraft, with a cargo receiving device is provided. The system includes a cargo receiving device including a base structure arrangement having a horizontal lower contact surface, and a locking mechanism configured to engage one or more corresponding holding members provided in a cargo compartment of a vehicle. The system also includes a transport device including a horizontal upper contact surface configured to be disposed in abutting contact to said lower contact surface, a drive unit configured to initiate horizontal movement of the transport device, a lift unit configured to initiate vertical movement of the upper contact surface, and an actuating unit configured to actuate the locking mechanism of the cargo receiving device.

18 Claims, 7 Drawing Sheets

(56) References Cited

U.S. PATENT DOCUMENTS

| | | | | |
|---|---|---|---|---|
| 3,899,092 A * | 8/1975 | Nordstrom | B60P 1/52 | 244/137.1 |
| 4,313,513 A * | 2/1982 | Terry | B60V 1/16 | 180/124 |
| 5,911,763 A * | 6/1999 | Quesada | E05C 9/043 | 292/36 |
| 6,517,028 B2 * | 2/2003 | Huber | B64D 9/00 | 244/118.1 |
| 6,557,800 B2 * | 5/2003 | Medina | B64D 9/00 | 193/35 R |
| 7,785,056 B2 * | 8/2010 | Sanford | B64D 9/00 | 414/392 |
| 2008/0157541 A1 * | 7/2008 | Olsen | E05C 9/06 | 292/34 |
| 2014/0255137 A1 * | 9/2014 | Haertel | B60P 1/52 | 414/529 |
| 2014/0367227 A1 * | 12/2014 | Schneider | B64C 1/20 | 198/791 |
| 2014/0377017 A1 * | 12/2014 | Panzram | B65G 51/03 | 406/88 |
| 2015/0225082 A1 * | 8/2015 | Levron | B64D 9/00 | 244/137.1 |

* cited by examiner

SYSTEM AND METHOD FOR LOADING AND UNLOADING A CARGO COMPARTMENT

CROSS-REFERENCE TO RELATED APPLICATION

This application claims priority to European Patent Application No. 13 73313.1, filed Jun. 21, 2013, which is incorporated herein by reference in its entirety.

TECHNICAL FIELD

The technical field relates to a system for loading and unloading a cargo compartment of a vehicle, such as an aircraft, with a cargo receiving device. A further aspect of the technical field relates to a method for loading a cargo compartment of a vehicle, such as an aircraft, with a cargo receiving device.

BACKGROUND

Prior art systems for loading and unloading a cargo compartment of an aircraft with cargo receiving devices comprise cargo compartments which are provided with various devices for transporting a cargo receiving device in the cargo compartment, as well as with a locking mechanism for locking the cargo receiving device in a desired position in the cargo compartment.

However, such transport device and locking mechanism forming part of the cargo compartment have considerable weight, and thus, increase the effective weight of the aircraft in which said cargo compartment is received. Further, service and maintenance of such transport device and locking mechanism installed inside the cargo compartment are rather complicated, as the responsible engineers have to work inside the cargo compartment. Additionally, such service and maintenance of the transport device and the locking mechanism requires the aircraft to stay on the ground, thereby decreasing the available operating time of the aircraft.

In addition, other objects, desirable features and characteristics will become apparent from the subsequent summary and detailed description, and the appended claims, taken in conjunction with the accompanying drawings and this background.

SUMMARY

According to various teachings of the present disclosure, provided is a system for loading and unloading a cargo compartment of an aircraft with a cargo receiving device, wherein the weight of the aircraft is reduced, the maintenance time forcing the aircraft to stay on the ground is reduced, as well as service and maintenance of the transport device and the locking mechanism are less complicated.

Thus, the present disclosure provides a system for loading and unloading a cargo compartment of a vehicle, such as an aircraft, with a cargo receiving device according to the various teachings of the present disclosure. The system comprises a cargo receiving device and a transport device.

It should be noted that a vehicle according to the present disclosure may be an aircraft, but may also be another vehicle, such as a truck, a train, or a ship. A cargo receiving device within the meaning of the current disclosure may be any commercial or also non-standard Unit Load Device (ULD), such as various containers or pallets. Such ULDs are commonly used to receive passenger luggage or commercial cargo units which are usually packaged separately, but may generally also be bulk.

It should be noted that a cargo compartment within the meaning of the present disclosure may be suitable and/or designed to receive certain kinds of ULDs or other cargo receiving devices. Such cargo compartments may be formed as elongate or longitudinal chambers having two opposite side walls, a floor, and a ceiling, wherein at least one entrance opening is provided in the side walls. The entrance opening my also be connected to the side walls by a short duct instead of being provided directly in the side walls, such that the entire cargo compartment is formed in L-shape or T-shape. Such cargo compartment may be configured to be received and installed in an aircraft but must not necessarily be installed in an aircraft, yet.

The cargo receiving device according to the various teachings of the present disclosure is configured to receive and secure a certain amount of various packed or bulk cargo. Said cargo receiving device comprises abase structure arrangement having a, horizontal, lower contact surface, and a locking mechanism configured to engage one or more corresponding holding members provided in a cargo compartment of a vehicle, such as an aircraft. Said base structure arrangement comprises a square shaped base plate supporting four side walls in the case of a container, and having a planar lower contact surface. However, the base plate may also be contoured or have differently shaped sections, such as e.g. rail elements. Behind the base plate the base structure arrangement comprises the locking mechanism which may be accessible for actuation through an opening in the base plate.

The transport device is in one example, formed as a robot device, and is configured to transport the cargo receiving device to a desired position in or out of a cargo compartment of a vehicle, such as an aircraft. Said transport device comprises a transport structure arrangement having a, generally horizontal, upper contact surface configured to be disposed in abutting contact to said lower contact surface of the cargo receiving device. The transport structure arrangement may have a transport plate including said upper contact surface.

The transport device further comprises a drive unit configured to initiate movement of the transport device relative to and along a surface on which the transport device is disposed, such as a floor surface of a cargo compartment of a vehicle, such as an aircraft, i.e. generally a horizontal movement. Said drive unit may be formed in various ways, e.g. as an air-jet drive unit, or as a common electromagnetic and/or electromechanic, hydraulic, or pneumatic drive unit. The drive unit may further comprise a distance sensor and a drive controlling unit controlling the horizontal movement of the transport device in dependence of the horizontal distance to e.g. a vertical wall of the cargo compartment or a further cargo receiving device detected by the distance sensor.

The transport device also comprises a lift unit conf g red to initiate a transverse and generally perpendicular movement of the transport structure arrangement relative to a surface on which the transport device is disposed, such as a floor surface of a cargo compartment of a vehicle, such as an aircraft, i.e. in one example, a vertical movement. Said lift unit may be formed in various ways, e.g. as an air cushion lift unit or as any common electromagnetic and/or electromechanic, hydraulic, or pneumatic lift unit. Further, the lift unit may comprise a lift sensor and a lift controlling unit controlling the vertical movement of the transport structure arrangement in dependence of the vertical position of the upper contact surface detected by the lift sensor.

Moreover, the transport device comprises an actuating unit configured to actuate the locking mechanism of the cargo receiving device, in one example, during the contact between upper and lower contact surfaces. The actuating unit may be provided on the transport structure arrangement under the transport plate, so that it may operate through an opening in the transport plate, i.e. in the upper contact surface. The actuating unit may be formed in various ways, e.g. as mechanic or electromagnetic actuators.

The terms "horizontal" or "vertical" within the meaning of the present disclosure refer to a situation where the transport device and the cargo receiving device are positioned on the floor of a cargo compartment normally located in a vehicle, such as the fuselage of an aircraft, which in turn is in a normal parking position on the ground.

In such a manner the transport device and the locking mechanism are not part of the cargo compartment, i.e. of the aircraft, any longer. The transport device is formed as a separate individual unit which is disposed in the cargo compartment only, when the aircraft is loaded, and which may be taken out of the aircraft before the aircraft departs. The locking mechanism is formed as a part of the cargo receiving device which may for service and maintenance reasons easily be taken out of the aircraft or being exchanged by a new cargo receiving device, so that the aircraft can be operated continuously and is not forced to remain on the ground to be serviced. Therefore, the above mentioned disadvantages are overcome by the system according to the current disclosure.

In one embodiment the transport structure arrangement comprises two or more roller elements having axes of rotation extending in parallel to one another and to the upper contact surface in a horizontal plane. Said roller elements being moveable perpendicularly with respect to the upper contact surface between a rolling position, where the roller elements extend over the upper contact surface away from the transport structure arrangement, and a retracted position, where the roller elements are retracted under the upper contact surface inside the transport structure arrangement. Instead of roller elements a belt conveyer device being retractable in the same way as the roller elements may also be installed in the transport structure arrangement.

By means of such retractable roller elements a cargo receiving device may be slid on a desired position on the transport device, whereupon the roller elements may be retracted, so that the lower contact surface of the cargo receiving device engages the upper contact surface of the transport device, thereby locking the position of the cargo receiving device on top of the transport device.

In one example, it is preferred that the roller elements are rotatingly driven by a roller drive unit. The roller drive unit comprises a position sensor configured to detect the position of the base structure arrangement of a cargo receiving device relative to the transport structure arrangement of said transport device. Further, the roller drive unit comprises a roller controlling unit configured to control the rotation of the roller elements in dependence of the position of the base structure arrangement detected by said position sensor.

In such a manner a cargo receiving device may moved to a desired position on the transport device, as soon as the lower contact surface of the cargo receiving device contacts and engages one of the roller elements. No external positioning devices or manual positioning is required any longer.

In one embodiment the lift unit comprises an air cushion arrangement provided on the transport structure arrangement opposite from the upper contact surface. The air cushion arrangement comprises one or more flexible air-guidance elements extending away from the transport structure arrangement opposite from the upper contact surface. The air cushion arrangement further comprises an air injection device having a plurality of lift nozzles configured to blow air along the air-guidance elements and away from the transport device. Said air cushion arrangement also comprises a lift controlling unit configured to individually control the air stream blown out of different lift nozzles dependence of the vertical position of the transport structure arrangement, i.e. of the upper contact surface, detected by a lift sensor. The required pressurized air may be provided to the transport device by means of a flexible air pipe connected to a pressurized air supply device provided on the ground outside the aircraft, for example, forming part of the Ground Handling Equipment (GHE).

By means of such air cushion arrangement heavy loads received in the cargo receiving device may be lifted easily, quickly, and precisely to the desired level. Further, the air cushion arrangement enables the transport device to slide over the surface on which it is positioned, i.e. the floor surface of the cargo compartment floor, so that a frictionless horizontal movement of the transport device is possible, and no wheels or tracks are required.

In one example, it is preferred that the air-guidance elements are formed as torus elements of a flexible material and having a hollow interior space. The lift nozzles are configured to blow air inside said interior space. The torus elements comprise one or more valves configured to let air stream out of the interior space into the environment around the torus elements, once the pressure inside the torus elements exceeds a predetermined threshold pressure. Generally, the valves let the air stream out in a direction to the centre of the torus elements and away from the transport structure arrangement.

In such a way the let out air accumulates in the hollow space in the centre of the torus and flows out from that space in the direction of the floor and then equally circumferentially to the sides, on that an air cushion is formed on which a frictionless sliding of the transport device over the floor is possible. Similar air cushion arrangements are commonly known as "air caster modules".

In one embodiment the drive unit is formed as an air stream drive arrangement. Said air stream drive arrangement comprises one or more drive nozzles configured to blow air in a direction away from the transport structure arrangement and inclined between a horizontal and vertical direction opposite from the upper contact surface. The air stream drive arrangement further comprises a drive controlling unit configured to individually control the air stream blown out of different drive nozzles in dependence of a horizontal position of the transport device detected by a distance sensor. Such drive nozzles may be provided on opposite sides of the transport device relating to the moving direction of the transport device in order to both slowing down the transport device and enabling movement of the transport device in opposite directions. Additionally, the angle of the drive nozzles may be adjustable continuously between a horizontal and a vertical position. Such air stream drive arrangement provides a considerably smooth movement of the transport device.

In one embodiment the drive unit is formed as an electromechanical drive arrangement. Said electromechanical drive arrangement comprises an electric or electromagnetic motor and a mechanic force transmission unit engaging a surface on which the transport vehicle is disposed, such as a floor surface of a cargo compartment of an aircraft. The electric motor may be formed as a common linear motor or as a rotating motor transferring a rotational movement to a wheel or gear engaging the floor surface. The electric motor may also be substituted by any hydraulic or pneumatic motor or actuator. Such electric, hydraulic or pneumatic motors are widely known in the art, easy and reasonable to install, and conveniently operable.

According to one embodiment the system further comprises a cargo compartment configured to be received in an aircraft fuselage. Said cargo compartment comprises a floor having a floor surface, and two opposite side walls including at least one entrance opening. The transport device is configured to move relative to said floor surface. The cargo compartment further comprises a holding member corresponding to the locking mechanism. The locking mechanism is configured to engage said holding member in order to lock the transport, device in its position relative to the cargo compartment.

The cargo compartment may have a longitudinal shape with a longitudinal axis essentially parallel to the longitudinal axis of the aircraft in which the cargo compartment may be received. Both ends of the cargo compartment may have end walls. One or more entrance openings may be provided on different position in the side walls or be connected to the side walls by a short duct, so that the cargo compartment, in particular the floor of the cargo compartment on which the cargo receiving device travels, has the shape of an L or a T. The longitudinal direction of the cargo compartment is considered the direction perpendicularly to the side walls. Further, the floor surface may be formed contoured, e.g. provided with spikes, so as to form resistance elements for the air blowing out of the drive nozzles. The cargo compartment may be installed in an aircraft but may also exist separately.

In one example, it is preferred that the floor surface of the cargo compartment comprises a recess channel extending along the longitudinal direction of the cargo compartment and to the entrance opening. Said recess channel is formed such that the transport device may be entirely received in the recess channel without extending above the level of the floor surface next to the recess channel. In such a way the transport device may move under the cargo receiving device, while cargo receiving device is positioned with its lower contact surface abutting the floor surface of the cargo compartment floor. The recess channel shall extend to the entrance opening in the shape of an L or T, so that it is accessible in horizontal direction from the recess opening. An alternative to such recess channel in the floor of the cargo compartment may be an equivalent recess in the base structure arrangement of the cargo receiving device, which corresponds to the dimensions of the transport device.

In one example, the lift unit is configured to move the transport structure arrangement between a lower position and an upper position. In the lower position the upper contact surface of the transport device extends inside the recess channel under the level of the floor surface of the cargo compartment next to the recess channel. In the upper position said upper contact surface extends outside of the recess channel above the level of said floor surface. In such a manner, in the lower position the transport device does not contact the lower contact surface of the cargo receiving device and, thus, is free to move under the cargo receiving device, while in the upper position the upper contact surface of the transport device engages the lower contact surface of the cargo receiving device, the cargo receiving device is lifted up from the floor surface and may be transported by the transport device to a new position.

According to one embodiment the locking mechanism is arranged in the base structure arrangement. Said locking mechanism comprises one or more horizontal pins. One or more holding members are arranged in the side walls, wherein each holding member comprises a bore configured to engage with one of the pins. Each pin is moveable perpendicularly to a side wall of the cargo compartment between a locking position, where the pin engages a bore, and an unlocking position, where the pin is retracted out of engagement with the bore. In one example, two or more pairs of opposite pins are provided, so that the locking mechanism safely locks the cargo receiving device in the cargo compartment with respect to all possible directions.

In one example, it is preferred that the locking mechanism further comprises a central transmission element which is arranged in the base structure arrangement rotatably about a vertical axis of rotation. Said central transmission element may have the shape of a flat cylinder the axis of symmetry of which extends perpendicularly with respect to the lower contact surface. The central transmission element is connected to the pins by means of rod elements. Said rod elements are mounted to the central transmission element in such a manner that upon rotation of the central transmission clement the rod elements transfer linear movement to the pins. The rod elements may be mounted pivotably to the central transmission element and to the pins. The central transmission element further comprises an engagement section configured for engagement with the actuating unit of the transport device. Said actuating unit is configured to transfer rotational movement to the central transmission element. The engagement section may comprise two or more spaced holes, and the actuating unit may have corresponding pin elements configured to engage the holes. Such locking mechanism allows to engage a plurality on pins to the corresponding bores by merely actuating, i.e. rotating, the central transmission element.

Alternatively, instead of by mechanical engagement with the actuating unit the central transmission element or the single pins may also be moved by means of e.g. a magnetic, hydraulic, or pneumatic actuation.

One of various aspects of the present disclosure relates to a method for loading a cargo compartment of a vehicle, such as an aircraft with a cargo receiving device, comprising the following steps: providing a system according to the embodiments described before; positioning the transport device on the floor surface of the cargo compartment according to embodiments described before; positioning the cargo receiving device on top of said transport device, so that the lower contact surface of the cargo receiving device abuts the upper contact surface of the transport device; lifting up the cargo receiving device by means of the unit, so that no part of the cargo receiving device is in contact with the floor surface; moving of the transport device together with the cargo receiving device by means of the drive unit along the floor surface to a desired position in the cargo compartment; moving downwards the transport structure arrangement by the lift unit until the cargo receiving device contacts the floor surface; actuating the locking mechanism of the cargo receiving device by the actuating unit of the transport device, so that the locking mechanism engages the holding member of the cargo compartment; and moving the transport device away from under the cargo receiving device by means of the drive unit, while the cargo receiving device remains locked in its desired position.

For unloading the cargo compartment the above described method may be carried out correspondingly in a reversed manner. It is appreciated that the same embodiments and advantages described above in connection with the system apply for the present method in a respective manner. In particular, roller elements are provided on the transport structure arrangement, the transport device comprises an air cushion arrangement as a lift unit and an air jet drive unit employing a plurality of drive nozzles, a mechanic locking mechanism employing several pairs of opposite pins and a central transmission element connected to the pins by pivotal rod elements and a recess channel is provided in the floor of the cargo compartment so as to receive the transport device.

In one embodiment the transport device comprises roller elements according to the embodiments described before, wherein positioning the cargo receiving device on top of said transport device is carried out in the following manner: moving or maintaining the roller elements in the rolling position; sliding the cargo receiving device on top of the transport device with the lower contact surface sliding over the upper contact surface, until at least one roller element engages the lower contact surface of the base structure arrangement; moving the cargo receiving device to a desired position on top of the transport device by a rotation of the roller elements initiated and controlled by means of the roller drive unit, and moving the roller elements down in the retracted position, wherein the lower contact surface abuts the upper contact surface.

The sliding the cargo receiving device on top of the transport device with the lower contact surface sliding over the upper contact surface may be performed by a mobile cargo conveyer device transporting the cargo receiving device either by means of driven roller elements or by inclining the surface, so that the cargo receiving devices slip over the roller elements onto the transport device.

In one embodiment the cargo receiving device comprises a locking mechanism and the cargo compartment comprises holding members according to the embodiments described before, wherein actuating the locking mechanism of the cargo receiving device by the actuating unit of the transport device is carried out in the following manner: engaging the engagement section of the central transmission element of the cargo receiving device by the actuating unit of the transport device; rotating the central transmission element by rotating the actuating unit; transforming the rotational movement of the central transmission element into a linear movement of the pins by means of the rod elements; engaging the bores of the holding members by the linearly moved pins; and disengaging the engagement section of the central transmission element by the actuating unit.

For unlocking the cargo receiving device the before described method may be carried out in reversed sense.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
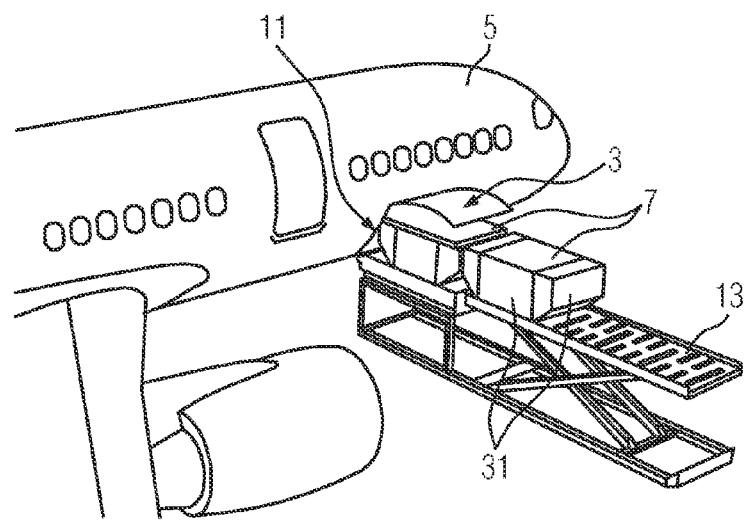
FIG. 1 is a perspective view of an aircraft the cargo compartment of which is loaded with a cargo receiving device according to the present disclosure by means of a cargo conveyer device.

The following detailed description is merely exemplary in nature and is not intended to limit the present disclosure or the application and uses of the present disclosure. Furthermore, there is no intention to be bound by any theory presented in the preceding background or the following detailed description.

The described embodiment of the system 1 for loading and unloading a cargo compartment 3 of an aircraft 5 with a cargo receiving device 7 according to the present disclosure comprises at least one cargo receiving device 7 and a transport device 9 configured to transport the cargo receiving device 7 to a desired position in the cargo compartment 3 of an aircraft 5 or out of said cargo compartment 3.

In FIG. 1 an aircraft 5 is illustrated comprising a cargo compartment 3 arranged in the aircraft fuselage. Said cargo compartment 3 is in the process of being loaded with a plurality of cargo receiving devices 7 according to the present disclosure. The cargo receiving devices 7 are transported to and provided at an entrance opening 11 of the cargo compartment 3 by means of a mobile cargo conveyer device 13 which is configured to convey or slide the cargo receiving devices through the entrance opening 11 into the cargo compartment 3.

Figure 2:
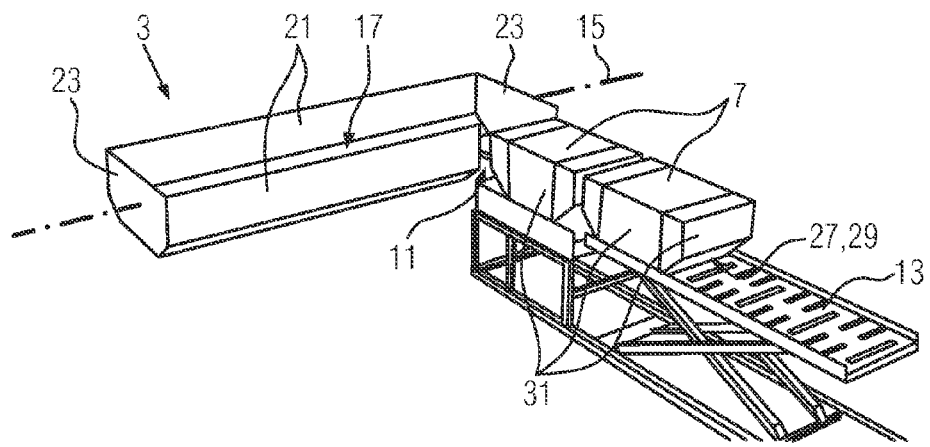
FIG. 2 is a perspective view of the cargo compartment of the aircraft of FIG. 1, isolated from the aircraft, FIG. 3 a perspective view of the cargo compartment of FIG. 2 with a transport device according to the present disclosure positioned in a recess channel on the floor of the cargo compartment.
Figure 3:
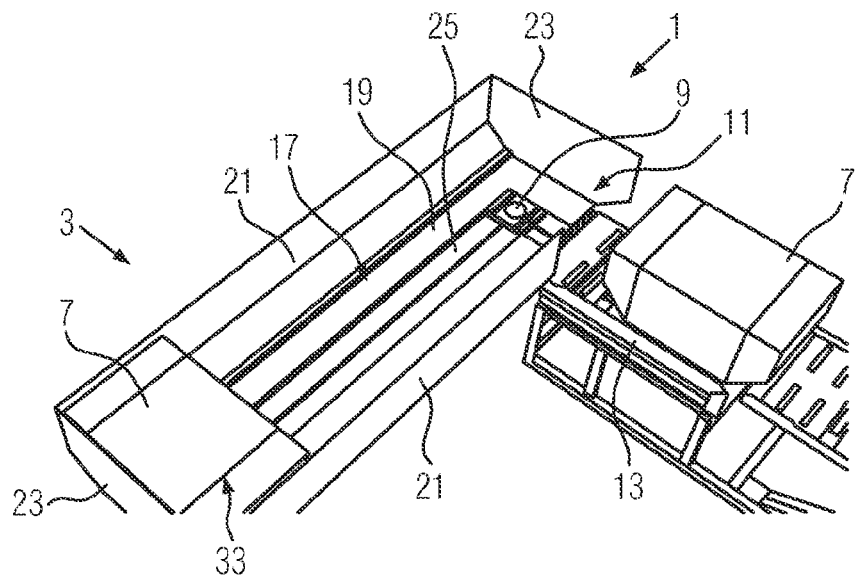

As shown in FIG. 2, where the cargo compartment 3 is illustrated isolated from the aircraft 5, the cargo compartment 3 extends along a longitudinal axis 15 essentially parallel to the longitudinal axis of the aircraft and comprises a floor 17 having a floor surface 19 (see FIG. 3), two opposite side walls 21 extending in parallel to the longitudinal axis 15, and two opposite end walls 23 extending perpendicularly to the longitudinal axis 15. The entrance opening 11 is provided in one of the side walls 21. Further, as shown in FIG. 3, the floor surface 19 comprises a recess channel 25, extending in parallel to the longitudinal axis 15 in the centre of the floor surface 19 and from there perpendicularly to the longitudinal axis 15 to the entrance opening 11 in the shape of an L. The cargo compartment 3 is installed in the aircraft 5 in such a way that during a normal parking position of the aircraft 5 the floor surface 19 extends in a horizontal plane.

The cargo receiving devices 7 are adapted to receive a certain amount of various cargo, such as passenger luggage, and in the present embodiment are formed as a commercial Unit Load Devices (ULDs). The cargo receiving devices 7 comprise a square base structure arrangement 27 having a horizontal lower contact surface 29 which is configured to abut the floor surface 19 of the cargo compartment 3, when the cargo receiving device 7 rests in a fixed position in the cargo compartment 3, and four device side walls 31 extending upwards from the base structure arrangement 27 in order to surround a cargo space 33 adapted to receive said cargo. The cargo receiving device 7 further comprises a locking mechanism 35 which is installed in the base structure arrangement 27 and which is configured to engage corresponding holding members 37 provided in the side walls 21 of the cargo compartment 3 and which may be actuated by an actuating unit 39 of the transport device 9.

Figure 4:
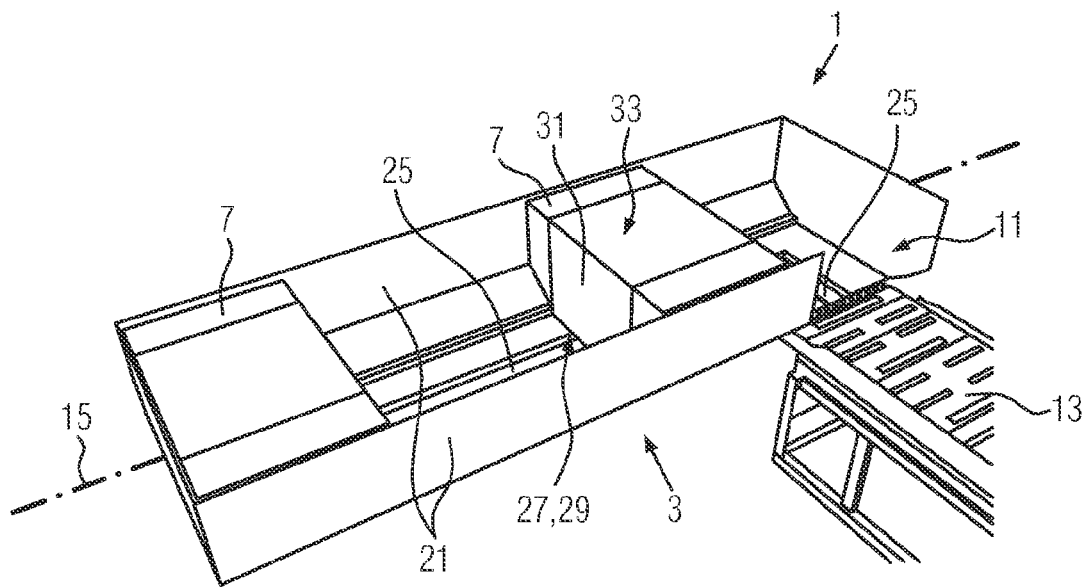
FIG. 4 is a perspective view of the cargo compartment of FIG. 3 with a cargo receiving device positioned on top of the transport device, while being moved to a desired position.
Figure 5:
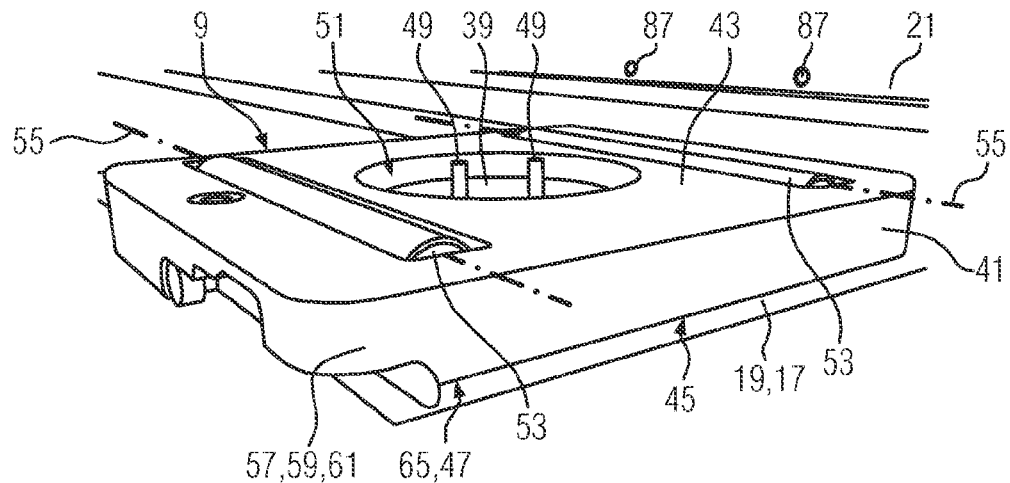
FIG. 5 is perspective view of the transport device of FIG. 3 with the roller elements in the rolling position and the actuating unit in a retracted position.
Figure 6:
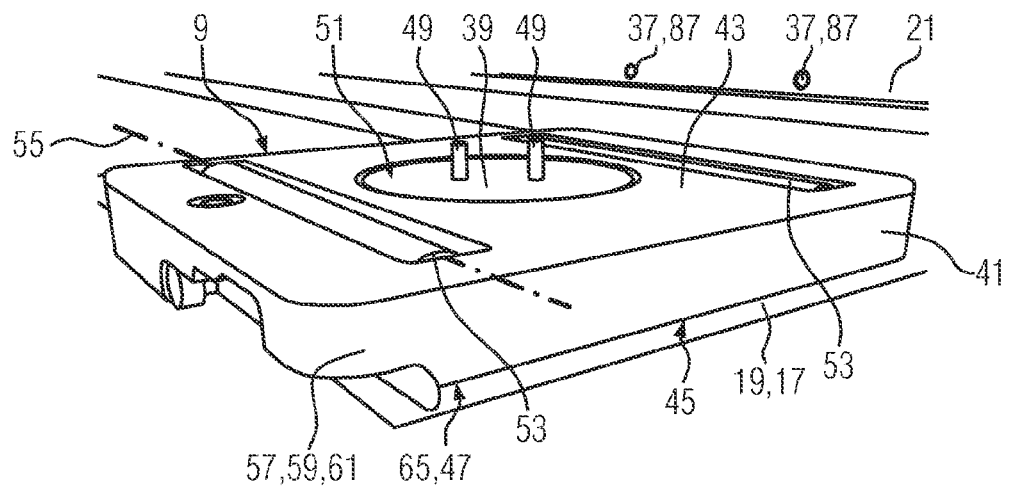
FIG. 6 is a perspective view of the transport device of FIG. 5 with the roller elements in the retracted position and the actuating unit in a engagement position.

The transport device 9 is shown in FIGS. 3, 5, and 6 and comprises a transport structure arrangement 41 having a horizontal upper contact surface 43 which is configured to abut on the lower contact surface 29 of the cargo receiving device 7 in order to transport the cargo receiving device 7 along the cargo compartment 3 (see FIGS. 3, 4).

The transport device 9 further comprises a drive unit 45 configured to drive the transport device 9 in a horizontal direction along the cargo compartment 3, see FIG. 4, As it is shown in FIG. 3, the transport device 9 is received and travels in the recess channel 25 provided in the floor surface 19 of the cargo compartment 3, so that the cargo receiving device 7 may slide over the transport device 9 on the top of the upper contact surface 43.

The transport device 9 also comprises a lift unit 47 configured to move the transport structure arrangement 41 in a vertical direction between a lower position, where the upper contact surface 43 extends under the floor surface 19 and inside the recess channel 25, and an upper position, where the upper contact surface 43 extends above the floor surface 19 and stands out of the recess channel 25.

Additionally, as shown in FIGS. 5 and 6, the transport device 9 comprises an actuating unit 39 configured to actuate the locking mechanism 35 so as to lock the cargo receiving device 7 in a desired position in the cargo compartment 3. The actuating unit 39 is formed as a flat cylinder or a disc which has two spaced pin elements 49, which is provided in the transport structure arrangement 41, and which may be moved in a vertical direction through an opening 51 in the upper contact surface 43 between a retracted position (see FIG. 5), where the pin elements 49 extend under the upper contact surface 43, and an engagement position (see FIG. 6), where the pin elements 49 extend above the upper contact surface 43 in order to engage the locking mechanism 35 of a cargo receiving device 7.

The transport device 9 further comprises two parallel roller elements 53 arranged in the transport structure arrangement 41 the axes of rotation 55 of which extend in parallel to the upper contact surface 43 and to the side walls 21. The roller elements 53 may be moved in a vertical direction between a rolling position (see FIG. 5), where the roller elements 53 extend over the upper contact surface 43 away from the transport structure arrangement 41, and a retracted position (see FIG. 6), where the roller elements 53 are retracted under the upper contact surface 43 inside the transport structure arrangement 41. The roller elements 53 are rotatingly driven by a roller drive unit 57 comprising a position sensor 59 configured to detect the horizontal position of the base structure arrangement 27 relative to the transport structure arrangement 41, and a roller controlling unit 61 configured to control the rotation of the roller elements 53 in dependence of the position of the base structure arrangement 27 detected by the position sensor 59.

Figure 7:
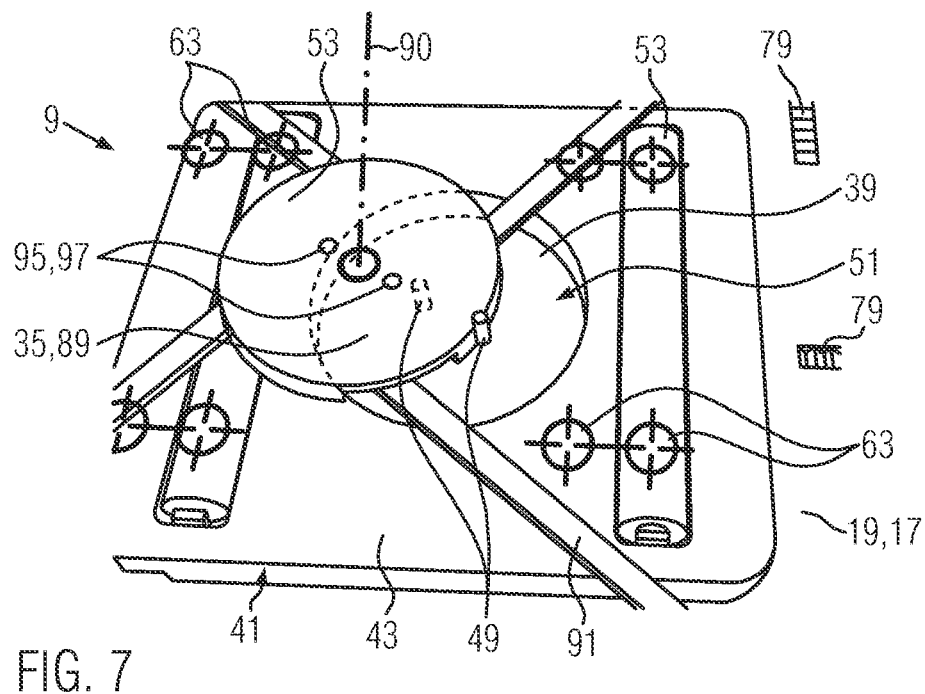
FIG. 7 is a perspective view the transport device of FIG. 3 before engagement of the actuating unit to the engagement section of the central transmission element of the locking mechanism of the cargo receiving device of FIG. 4, the locking mechanism being shown in a transparent manner.
Figure 8:
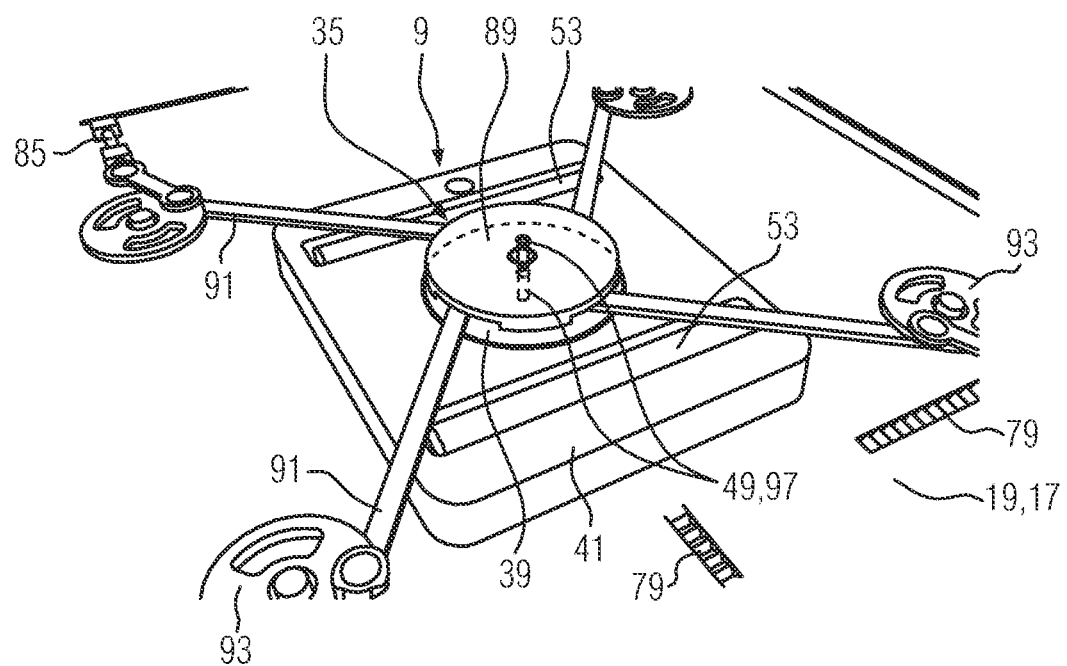
FIG. 8 is a perspective view of the transport device of FIG. 7, wherein the actuating unit engages the engagement section of the central transmission element of the locking mechanism of the cargo receiving device of FIG. 4, the locking mechanism being shown in a transparent manner.

The process of positioning the cargo receiving device 7 in a desired position on top of the transport device 9 via the controlled driven roller elements 53 is illustrated in FIGS. 7 and 8, where the correct position of the cargo receiving device 7 over the transport device 9 is detected by a pair of cross lines 63 projected to the roller elements 53 and correspondingly to the lower contact surface 29 (see FIG. 7). These cross lines 63 are tracked by a camera system, so that upon correlation of which the desired position is reached and the roller elements 53 are stopped (see FIG. 8). Positioning of the cargo receiving device 7 in a desired position on top of the transport device 9 could be arranged also by color coding or optical sensors.

Figure 9:
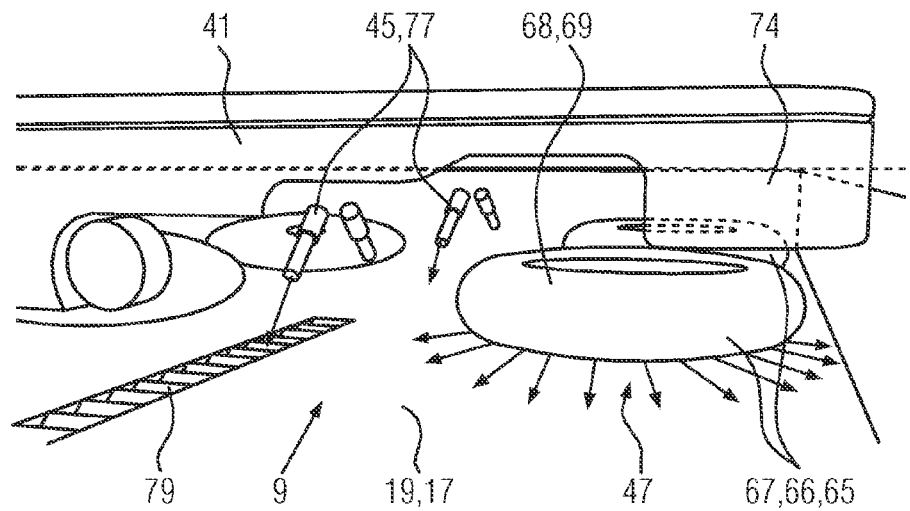
FIG. 9 is a perspective view of the air cushion arrangement of the lift unit of the transport device of FIG. 3, parts of said transport device being shown transparently.
Figure 10:
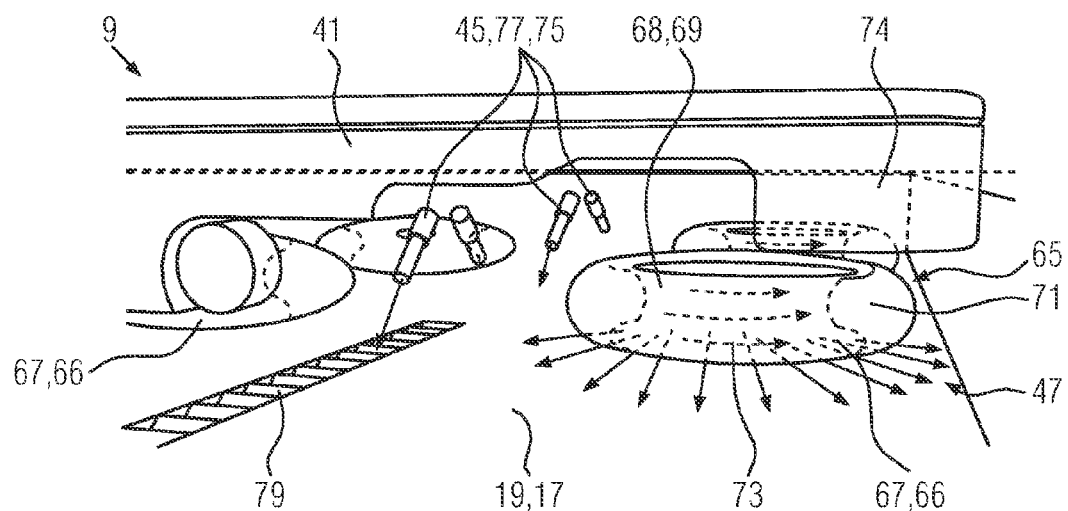
FIG. 10 is a perspective view of the air cushion arrangement of FIG. 9, wherein the torus elements and the transport structure arrangement are illustrated transparently.

As shown in FIGS. 9 and 10, the lift unit 47 is formed as an air cushion arrangement 65 comprising four air-guidance elements 66 formed as torus elements 67 of elastic material provided on the transport structure arrangement 41 opposite from the upper contact surface 43, and an air injection device 68 having a plurality of lift nozzles 69 configured to blow air inside the hollow interior space 71 of the torus elements 67. The torus elements 67 further comprise a plurality of valves 73 configured to let air stream out of the interior space 71 in a direction to the centre of the torus elements 67 and to the floor surface 19, i.e. away from the transport structure arrangement 41 in a way to build up pressure below torus elements, once the pressure inside the torus elements 67 exceeds a certain threshold pressure, so that an air cushion forms under the torus elements 67 by the air (in FIGS. 9 and 10 indicated by arrows) streaming away from the centre of the torus elements 67 in a circumferential manner. The air cushion arrangement 65 also comprises a lift controlling unit 74 configured to individually control the air stream blown out of the lift nozzles 69 in order to control the vertical position of the transport structure arrangement 41.

Figure 11:
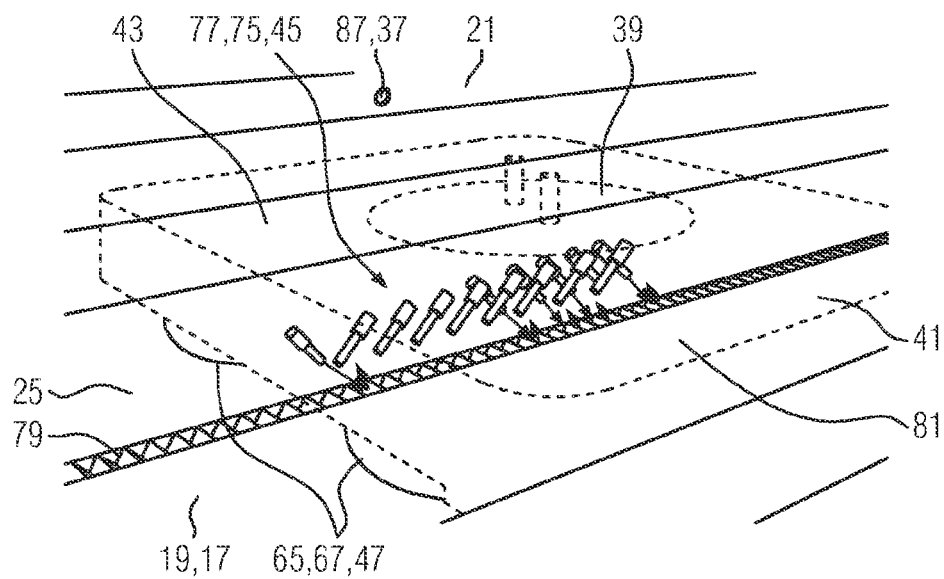
FIG. 11 is a perspective view of the air stream drive arrangement of the transport device of FIG. 3, the transport structure arrangement being shown transparently.
Figure 12:
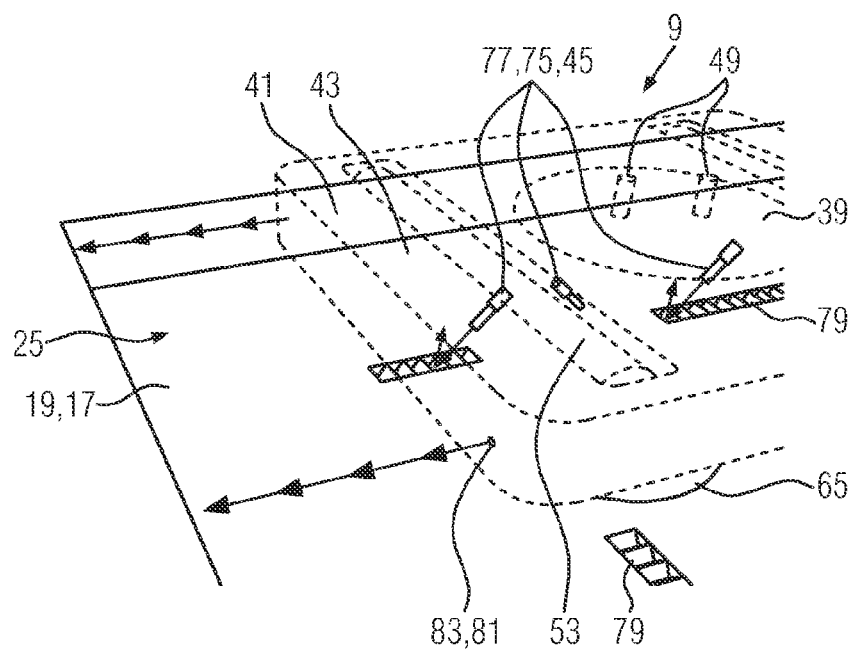
FIG. 12 is a perspective view of the distance sensor of the air stream drive arrangement of FIG. 11, the transport structure arrangement being shown transparently.

As it is illustrated in FIGS. 11 and 12, the drive unit 45 comprises an air stream drive arrangement 75 including a plurality of drive nozzles 77 provided on the transport structure arrangement 41 and configured to blow air (in FIGS. 9 to 12 indicated by arrows) to the floor surface 19 in a direction inclined between the longitudinal axis 15 of the cargo compartment 3 and a vertical direction (see FIG. 11). A part of the drive nozzles 77 are inclined to the moving direction of the transport device 9 and another part of the drive nozzles 77 are inclined opposite to the moving direction, so that the transport device 9 may move in the opposite direction or that the transport device 9 may be slowed down (see FIG. 12). Additionally, in the area, where the air stream (arrows) contacts the floor surface 19, there is a line of spikes 79 provided on the floor surface 19 in order to form resistance for the air stream. The air stream drive arrangement 75 comprises a drive controlling unit 81 configured to control the air stream blown out of the drive nozzles 77 in dependence of the horizontal position of the transport device 9 in the recess channel 25 detected by a distance sensor 83 (see FIG. 12).

Figure 13:
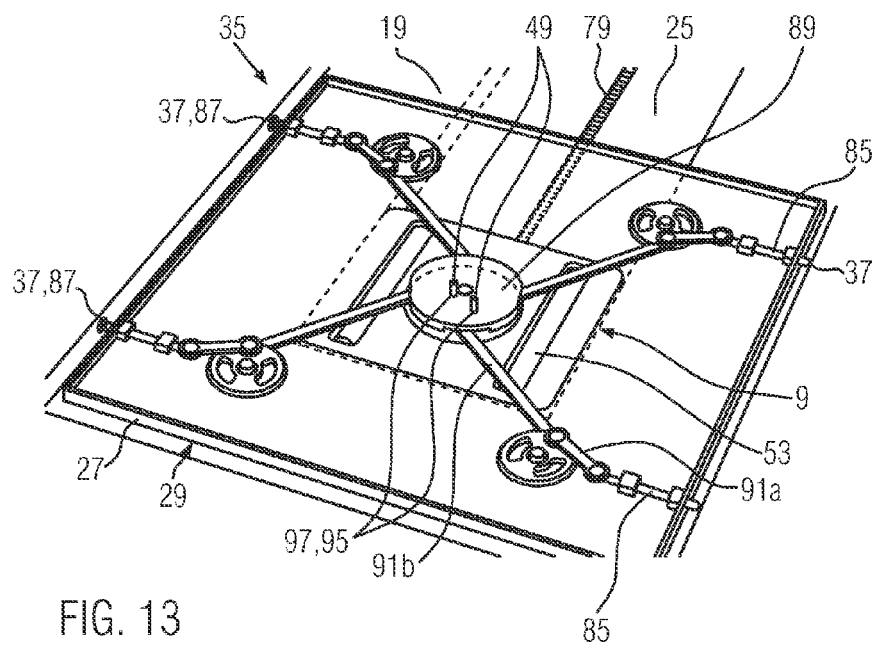
FIG. 13 is a perspective view of the locking mechanism of the cargo receiving device of FIG. 4, wherein the engagement section of the central transmission element is engaged by the actuating unit of the transport vehicle and the pins are in the unlocking position, parts of the locking mechanism and the base structure arrangement being shown transparently.
Figure 14:
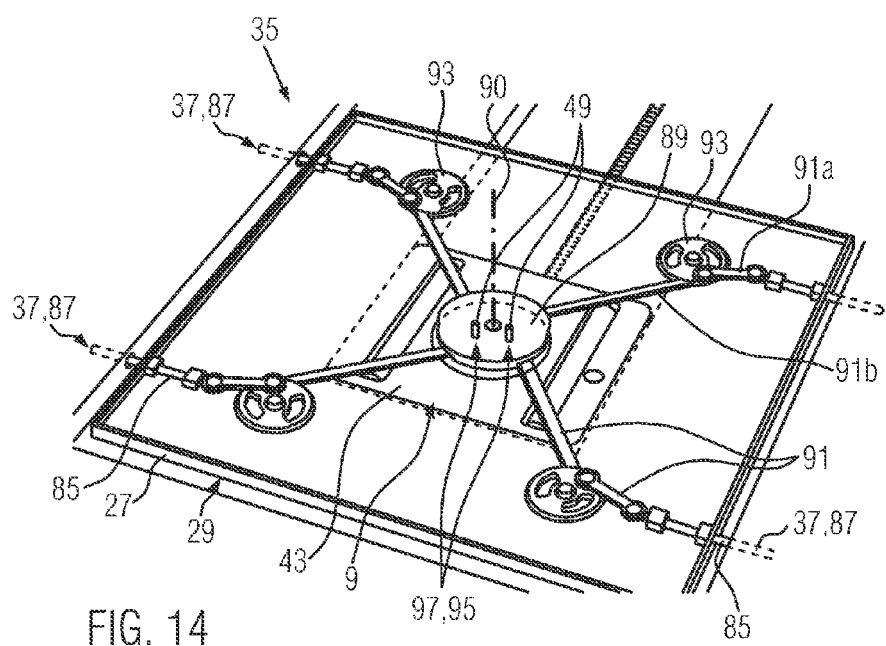
FIG. 14 is a perspective view of the locking mechanism of FIG. 13, wherein the pins are in the locking position engaged with the bores of the holding elements in the side walls of the cargo compartment, parts of the locking mechanism and the base structure arrangement being shown transparently.

As shown in FIGS. 13 and 14, the locking mechanism 35 comprises two pairs of opposite pins 85 which are movable in a horizontal direction and perpendicularly to the side walls 21 between an unlocking position (see FIG. 13), where the each pin 85 is retracted from the holding members 37 in the side walls 21 into the base structure arrangement 27, and a locking position (see FIG. 14), where each pin 85 engages a corresponding bore 87 of a holding member 37 in the side walls 21. The movement of the pins 85 is initiated by a rotational movement of a central transmission element 89 having the shape of a disc and being rotatable about a vertical axis of rotation 90. Said central transmission element 89 is mechanically connected to the pins 85 by means of rod elements 91 which are pivotally mounted to both the central transmission element 89 and the pins 85. Each rod element 91 may comprise two rod portions 91a, 91b which are pivotally connected to one another, said connection being supported by a kinematic support element 93.

The locking mechanism 35 is actuated, i.e. the pins 85 are engaged or disengaged to the bores 87, by a rotation of the central transmission element 89. Said central transmission element 89 may be rotated by means of the actuating unit 39 of the transport device 9, after said actuating unit 39 has been engaged to an engagement section 95 of the central transmission element 89 in such a manner that the pin elements 49 of the actuating unit 39 engage corresponding bore members 97 in the engagement section 95.

The method for loading said cargo compartment 3 is carried out as follows. First, a system 1 for loading or unloading the cargo compartment 3 with a cargo receiving device 7 as described before is provided. Then, the transport device 9 is positioned on the floor surface 19 of the cargo compartment 3 e.g. by hand.

Subsequently, the cargo receiving device 7 is positioned on top of the transport device 9 by means of a cargo conveyer device 13, wherein first the roller elements 53 of the transport device 9 are brought into the rolling position, then the cargo receiving device 7 is slid over of the transport device 9 until one roller element 53 engages the lower contact surface 29 of the base structure arrangement 27, subsequently, the cargo receiving device 7 is moved to a desired position over the transport device 9 by a rotation of the roller elements 53 initiated and controlled by means of the roller drive unit 57, and finally, the roller elements 53 are moved down in the retracted position, so that the lower contact surface 29 abuts the upper contact surface 43.

As a next step, the cargo receiving device 7 is lifted up by means of the lift unit 47, i.e. the air cushion arrangement 65, so that it is entirely removed from the floor surface 19. Then, the transport device 9 together with the cargo receiving device 7 is moved by the drive unit 45 along the floor surface 19 to a desired position in the cargo compartment 3. Then, the transport structure arrangement 41 is moved down by means of the lift unit 47 until the cargo receiving device 7 contacts the floor surface 19.

Subsequently, the locking mechanism 35 is actuated, wherein the engagement section 95 of the central transmission element 89 of the cargo receiving device 7 is engaged by the actuating unit 39 of the transport device 9, the central transmission element 89 is rotated by a rotation of the actuating unit 39, the rotational movement of the central transmission element 89 is transformed into a linear movement of the pins 85 by means of the rod elements 91, whereupon the bores 87 of the holding members 37 are engaged by the linearly moved pins 85. Afterwards, the engagement section 95 of the central transmission element 89 is disengaged from the actuating unit 39.

Finally, the transport device 9 is moved away from under the cargo receiving device 7 by means of the drive unit 45, while the cargo receiving device 7 remains locked in its desired position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A system for loading and unloading cargo into and from a cargo compartment of a vehicle, comprising:
    a cargo receiving device configured to receive and secure items of packed or bulk cargo, said cargo receiving device comprising:
        a base structure arrangement having a lower contact surface, and
        a locking mechanism configured to engage one or more corresponding holding members provided in the cargo compartment, and
    a transport device for transporting the cargo receiving device to a desired position in or out of the cargo compartment of the vehicle, said transport device comprising:
        a transport structure arrangement having a upper contact surface configured to be disposed in abutting contact to said lower contact surface of the cargo receiving device and to support the cargo receiving device by the abutting contact,
        a drive unit configured to effect movement of the transport device relative and parallel to a surface on which the transport device is disposed,
        a lift unit configured to effect movement of the transport structure arrangement relative and transversely to a surface on which the transport device is disposed, and an actuating unit configured to actuate the locking mechanism of the cargo receiving device.

2. The system according to claim 1, wherein the transport structure arrangement comprises two or more roller elements having axes of rotation extending in parallel to one another and to the upper contact surface, said roller elements being moveable perpendicularly with respect to the upper contact surface between a rolling position, in which the roller elements extend upwardly beyond the upper contact surface, and a retracted position, in which the roller elements are retracted under the upper contact surface inside the transport structure arrangement.

3. The system according to claim 2, wherein the roller elements are rotatingly driven by a roller drive unit
wherein the roller drive unit comprises a position sensor configured to detect a position of a base structure arrangement of the cargo receiving device relative to the transport structure arrangement of said transport device, and
wherein the roller drive unit comprises a roller controlling unit configured to control the rotation of the roller elements based on the position of the base structure arrangement detected by said position sensor.

4. The system according to claim 1, wherein the lift unit comprises an air cushion arrangement provided on the transport structure arrangement opposite from the upper contact surface.

5. The system according to claim 4, wherein the air cushion arrangement comprises:
one or more flexible air-guidance elements extending away from the transport structure arrangement opposite from the upper contact surface,
an air injection device having a plurality of lift nozzles configured to blow air along the air-guidance elements and away from the transport device, and
a lift controlling unit configured to individually control an air stream blown out of the different lift nozzles.

6. The system according to claim 5, wherein the air-guidance elements are formed as torus elements made of a flexible material and having a hollow interior space.

7. The system according to claim 6, wherein the plurality of lift nozzles are configured to blow air inside said interior space, and the torus elements comprise one or more valves configured to let air stream out of the interior space into the environment around the torus elements once the pressure inside the torus elements exceeds a predetermined threshold pressure.

8. The system according to claim 1, wherein the drive unit is formed as an air stream drive arrangement comprising:
one or more drive nozzles configured to blow air in a direction away from the transport structure arrangement and inclined between a horizontal and vertical direction opposite from the upper contact surface, and
a drive controlling unit configured to individually control the air stream blown out of different drive nozzles based on a position of the transport device on a surface on which the transport device is supported.

9. The system according to claim 8, wherein the position of the transport device on the surface is detected by a distance sensor.

10. The system according to claim 1, wherein the drive unit is configured as an electromechanical drive arrangement comprising an electric motor and a mechanic force transmission unit engaging a surface on which the transport vehicle is disposed.

11. The system according to claim 1, wherein the system further comprises the cargo compartment configured to be received in the vehicle, said cargo compartment comprising a floor having a floor surface, and two opposite side walls including at least one entrance opening,
wherein the transport device is configured to be supported on and to move relative to the floor surface, and
wherein the locking mechanism is configured to engage the corresponding one of the holding members upon actuation by the actuating unit in order to lock the transport device in a position relative to the cargo compartment determined by the corresponding one of the holding members.

12. The system according to claim 11, wherein the cargo compartment is elongate and the floor surface of the cargo compartment comprises a recess channel extending along a longitudinal axis of the cargo compartment,
wherein the recess channel is shaped and dimensioned such that the transport device is entirely received in the recess channel without extending above the level of the floor surface adjacent to the recess channel.

13. The system according to claim 12, wherein the lift unit is configured to move the transport structure arrangement between a lower position, in which the upper contact surface extends inside the recess channel below the level of the floor surface adjacent to the recess channel, and an upper position, in which the upper contact surface extends outside of the recess channel above the level of the floor surface.

14. The system according to claim 13, wherein the locking mechanism is arranged in the base structure arrangement, wherein:
the locking mechanism comprises one or more pins,
the one or more holding members are arranged in the side walls, each one of the holding members comprising a bore configured to engage with a respective one of the pins, and
each pin is moveable with respect to the side wall of the cargo compartment between a locking position, in which the pin engages a respective one of the bores, and an unlocking position, in which the pin is retracted out of engagement with the respective one of the bores.

15. The system according to claim 14, wherein the locking mechanism further comprises a central transmission element which is arranged in the base structure arrangement such that it is rotatable about a vertical axis of rotation, wherein:
said central transmission element is connected to the pins by means of rod elements,
the rod elements are mounted to the central transmission element in such a manner that upon rotation of the central transmission element the rod elements transfer linear movement to the pins, and
the central transmission element comprises an engagement section configured to engage with the actuating unit of the transport device, said actuating unit being configured to transfer rotational movement to the central transmission element.

16. A method for loading a cargo compartment of a vehicle, with a cargo receiving device, the method comprising the steps of:
providing a cargo receiving device configured to receive and secure items of packed or bulk cargo and a transport device for transporting the cargo receiving device to a desired position in or out of the cargo compartment,
positioning the transport device on a floor surface of the cargo compartment,
positioning the cargo receiving device over said transport device, so that a lower contact surface of the cargo receiving device abuts an upper contact surface of a transport structure arrangement, lifting up the cargo receiving device by means of a lift unit, so that no part of the cargo receiving device is in contact with the floor surface, moving the transport device together with the cargo receiving device by a drive unit along the floor surface to a desired position in the cargo compartment, moving downwardly the transport structure arrangement by the lift unit until the cargo receiving device contacts the floor surface, actuating a locking mechanism of the cargo receiving device by an actuating unit of the transport device, so that the locking mechanism engages at least one holding member of the cargo compartment, and moving the transport device away from under the cargo receiving device by the drive unit, while the cargo receiving device remains locked in its desired position.

17. The method according to claim 16, wherein positioning the cargo receiving device over said transport device is carried out in the following manner:

moving or maintaining roller elements of a roller drive unit of the transport structure arrangement in a rolling position, sliding the cargo receiving device over the transport device, until at least one roller element of the roller elements engages the lower contact surface of a base structure arrangement of the cargo receiving device, moving the cargo receiving device to a desired position over the transport device by a rotation of the roller elements effected and controlled by a roller drive unit, and moving the roller elements to a retracted position, such that the lower contact surface abuts the upper contact surface.

18. The method according to claim 16, wherein actuating a locking mechanism of the cargo receiving device is carried out in the following manner:

engaging an engagement section of a central transmission element of the cargo receiving device by the actuating unit of the transport device, rotating the central transmission element by rotating the actuating unit, transforming the rotational movement of the central transmission element into a linear movement of one or more pins by one or more rod elements mounted to the central transmission element, engaging one or more bores of the at least one holding member by the linearly moved pins, and disengaging the engagement section of the central transmission element by the actuating unit.

* * * * *